J. REPKING.
OPERATING ATTACHMENTS FOR TRACTORS.
APPLICATION FILED JAN. 16, 1920.
1,358,874.
Patented Nov. 16, 1920.
3 SHEETS—SHEET 3.
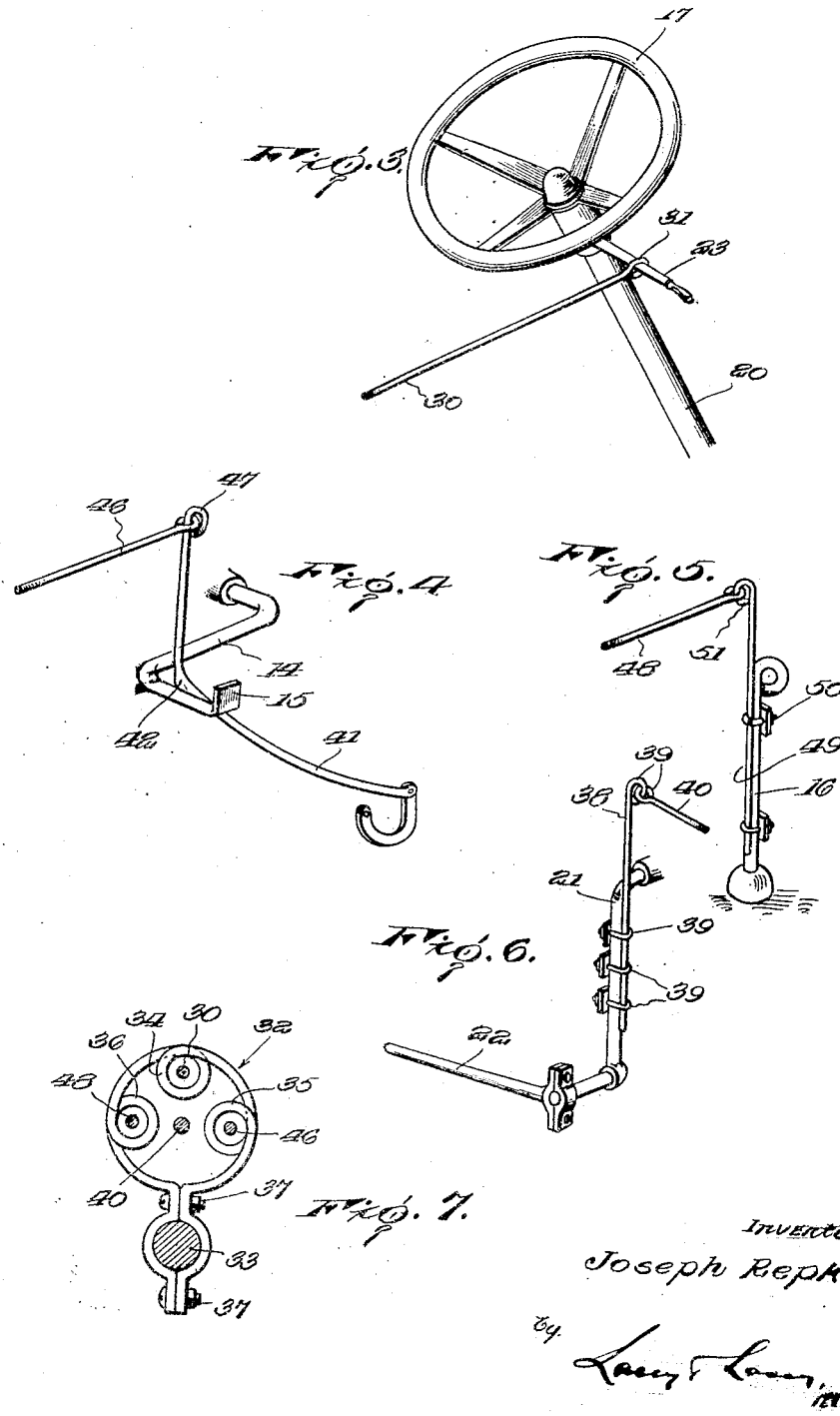
Inventor.
Joseph Repking

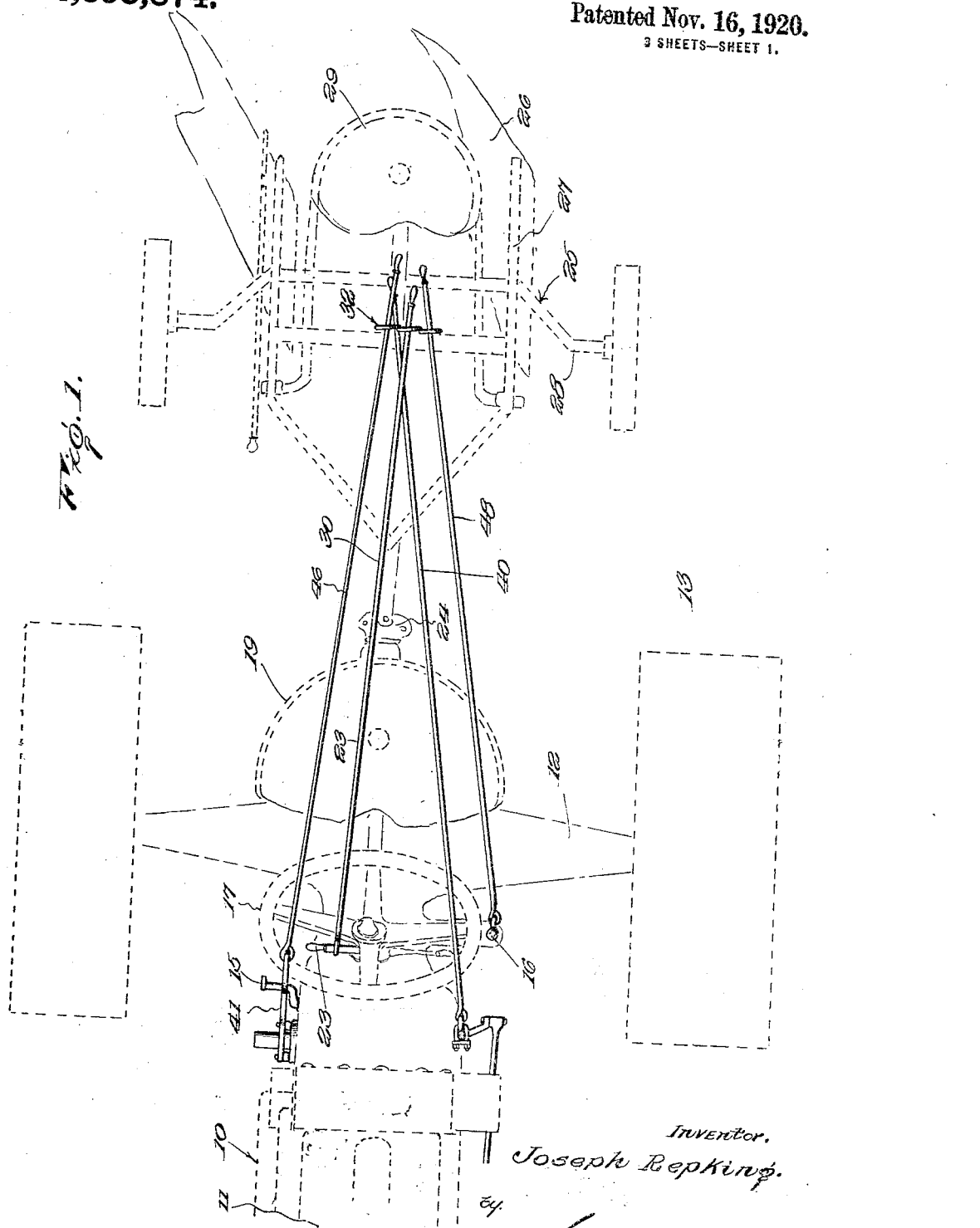

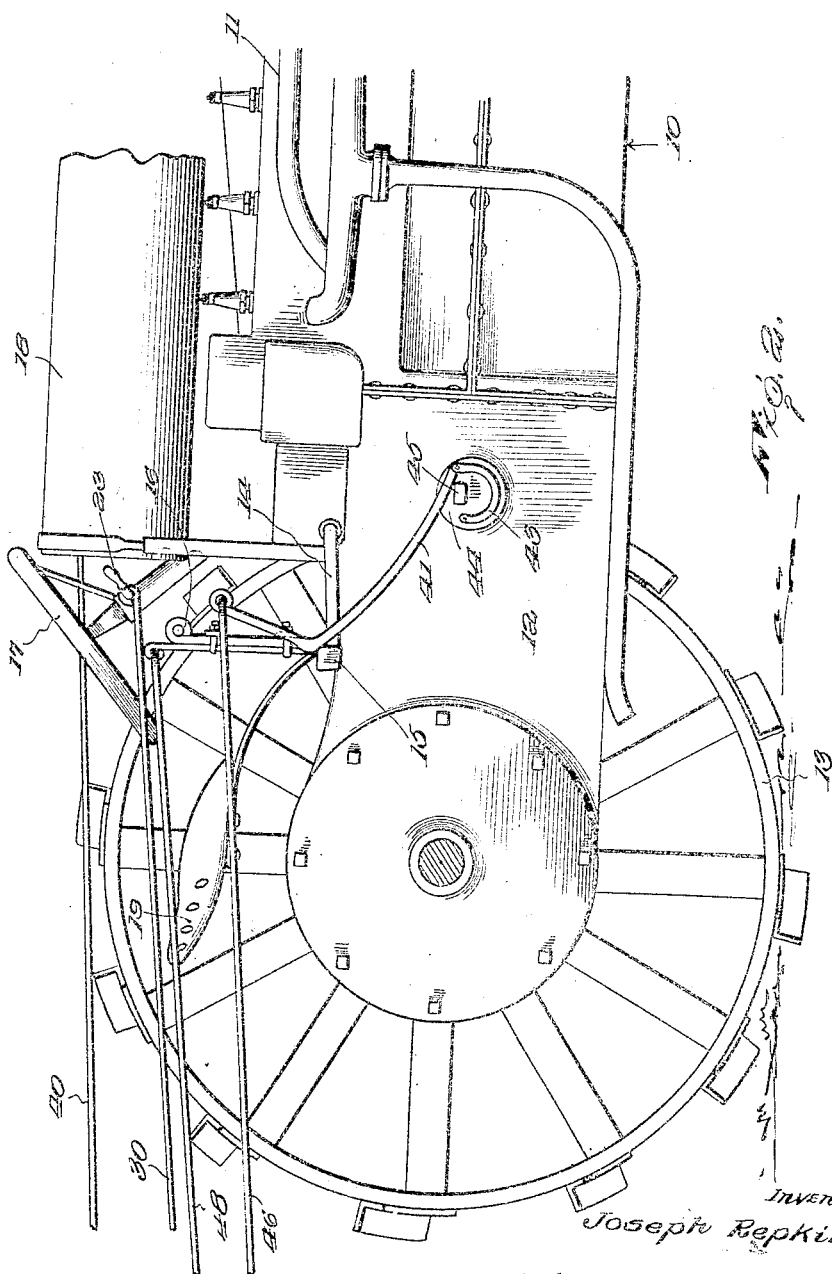

UNITED STATES PATENT OFFICE.

JOSEPH REPKING, OF EFFINGHAM, ILLINOIS.

OPERATING ATTACHMENTS FOR TRACTORS.

1,358,874.　　　　Specification of Letters Patent.　　Patented Nov. 16, 1920.

Application filed January 16, 1920. Serial No. 351,767.

*To all whom it may concern:*

Be it known that I, JOSEPH REPKING, a citizen of the United States, residing at Effingham, in the county of Effingham and State of Illinois, have invented certain new and useful Improvements in Operating Attachments for Tractors, of which the following is a specification.

This invention relates to improvements in tractors and more particularly to the controlling means therefor.

An important object of this invention is to provide a controlling attachment for tractors which may be operated from the implement pulled by the tractor whereby the operator may seat himself upon the implement and exercise complete control over the tractor.

A further object of this invention is to provide a controlling attachment for tractors having a novel form of clutch releasing means whereby the clutch may be depressed from a distant point.

A further object of this invention is to provide a control mechanism for tractors having novel means whereby the tractor may be steered from a distant point.

A further object of the invention is to provide a controlling mechanism for tractors provided with a novel form of gear shift operating means.

A further object of the invention is to provide a controlling mechanism for tractors which is adapted to be operated from an implement or vehicle pulled by the tractor and which is provided with novel means for accurately controlling the speed of the tractor to meet various conditions encountered during travel.

A further object of this invention is to provide a controlling mechanism for tractors which may be readily applied without the exercise of a high degree of skill or without necessitating any material alteration in the construction of the tractor.

A further object of the invention is to provide a control mechanism for tractors which is of highly simplified construction, simple to operate and desirable in use.

Other objects and advantages of the invention will be apparent during the course of the following description.

In the accompanying drawings forming a part of this application and in which like numerals are employed to designate like parts throughout the same:

Figure 1 is a plan view of the improved tractor controlling mechanism in use,

Fig. 2 is a fragmentary side elevation of a tractor having the improved controlling mechanism applied thereto.

Fig. 3 is a fragmentary perspective of the speed controlling mechanism applied,

Fig. 4 is a fragmentary perspective of the clutch releasing mechanism applied,

Fig. 5 is a fragmentary perspective of the gear shift control mechanism applied, Fig. 6 is a similar view of the steering mechanism applied, and Fig. 7 is an elevation of a device for supporting the free ends of the operating devices and which is adapted to be attached to the implement propelled by the tractor.

In the drawings wherein for the purpose of illustration is shown a preferred embodiment of the invention, the numeral 10 generally designates a tractor having a prime mover 11 in the form of an internal combustion engine and the numeral 12 indicates a rear axle housing. The traction wheels 13 are supported by the axle of the housing 12 and have connection with the internal combustion engine through the usual power transmitting means. A clutch lever 14 extends out from one side of the housing 12 and is provided with a laterally extending foot piece or pedal 15 which is adapted to be depressed by one foot of the operator when it is desired to release the connection between the internal combustion engine and the traction wheels 13. The usual gear shift lever 16 extends upwardly from the housing and has connection with the transmission gears so that when it is desired to shift the gears within the transmission, the operator may manually position the same as desired.

As best illustrated in Figs. 2 and 3, a steering wheel 17 is arranged rearwardly of a fuel tank 18 and forwardly of the operator's seat 19 and is adapted to be rotated for controlling the direction of travel of the tractor. The steering wheel 17 is provided with a column extended through a casing 20 and having connection with a depending arm 21 carried by one side of the housing 12 and having connection with a forwardly extending steering rod 22. As is well known, the steering rod 22 extends forwardly and has connection with the front wheels of the tractor so that when the steering wheel is rotated the front wheels of the tractor will be correspondingly turned. A throttle lever 23 is extended through the casing 20 of the steering column and has connection with the butterfly valve of the carbureter so as to manually control the fuel supply to the motor.

With reference to Fig. 2 it will be noted that the housing 12 is provided with a draw bar cap 24 which is adapted for use when it is desired to hitch an agricultural implement such as a plow 25 to the tractor. It is obvious, however, that any other agricultural implement may be attached to the tractor without departing from the spirit of the invention herein illustrated. In the case of the implement herein illustrated, the same is provided with a pair of ground working blades 26 mounted on beams 27 carried by an axle 28. A suitable seat 29 is supported by the implement and is adapted for use by the operator of the plow.

With particular reference to Figs. 2 and 3, it will be noted that a rod 30 has its forward end looped, as indicated at 31, and connected to the gas throttle 23 so that by a movement of the rod 30 the speed of the tractor may be regulated. The rear end of the rod 30 is slidably supported by an arched head 32 rigidly secured to a beam 33 or other stationary part of the implement 25.

As illustrated in Fig. 7, the arched head 32 is formed from a single length of metal preferably a stout round wire bent to provide loops 34, 35 and 36 arranged on the inner side of the head in spaced relation to each other. The end portions of the length of wire from which the arched head is formed are rigidly connected by bolts 37 which serve to strap the arched head to the beam at a point adjacent the operator's seat 29. The rear end portion of the rod 30 is slidably extended through the loop 34 and by reason of being located in proximity to the operator's seat of the implement, the same may be readily and conveniently operated.

The depending arm or lever 21 of the steering apparatus is connected to a link or rod 38 by a plurality of spaced U-bolts 39. As particularly illustrated in Fig. 6, the upper end of the link 38 is connected through the medium of interlocked loops 39' to the rearwardly extending rod 40 having its rear end portion slidably extended through the arched head 32. The arm 38 may be adjusted vertically for increasing or decreasing the leverage on the depending arm 21. The steering rod or member 40 is adapted to be constantly held in the hand of the operator during the travel of the tractor and the implement so that the direction of travel of the tractor will at all times be under the direct control of the operator.

The clutch pedal 15 is engaged by a pivoted arm 41 having its intermediate portion curved or notched, as indicated at 42, to receive the pedal. The forward portion of the arm 41 is pivoted to a bracket 43 which in turn is pivoted to a cover plate 44 having a foot rest 45. Incidentally, the cover plate 44 found on a Fordson tractor is adapted to be removed when it is desired to apply the pulley attachment used in connection with the Fordson tractor. The upper end of the pivoted arm 41 is connected to a rearwardly extending rod 46 through the medium of a pair of interlocked loops 47. The rear end portion of the rod 46 is extended through the loop 35 so that when it is desired to depress the clutch of the tractor it is merely necessary to draw the rod rearwardly. This obviously exerts a downward pressure on the pedals 15 for moving the lever downwardly.

The gear shift lever 16 mounted on the housing of the tractor has connection with the rearwardly extending rod 48 through the medium of a vertical rod 49 strapped to the lever by a plurality of spaced U-bolts 50. Interlocked loops 51 serve to pivotally connect the upright rod 49 with the rearwardly extending rod 48. The rear end portion of the rod 48 extends through the loop 36 of the arched head so that the same may be readily gripped by the operator who is seated on the implement 25. The rod 48 may be moved either longitudinally or transversely for engaging the desired gears in the transmission. When it is desired to move the rod 48 sidewise, the operator may grip the same forwardly of the arched head 32, so as to cause the arched head to function in a measure as a fulcrum.

In the operation of the device, the operator starts the motor and then takes his place on the seat 29 directly behind the rear end portions of the operating rods. When it is desired to start the tractor, the clutch 15 is depressed by pulling the rod 46 rearwardly. The rod 48 is now properly moved for engaging the desired gears of the transmission. When it is desired to change the gears within the transmission for increasing the speed of the tractor, the clutch may again be depressed by a rearward movement of the rod 46 to permit the lever 16 of the transmission to be moved in the desired direction. While the gears are being changed and in fact during the entire operation of the tractor, the supply of fuel to the motor may be controlled by a forward or rearward movement of the rod 30 which moves the throttle lever 23 in the desired direction. The tractor is controlled in its direction of travel by the forward or rearward movement of the rod 40 which in turn moves the lever 21 on its horizontal pivot. The movement of the lever 21 causes the steering rod 22 to partake of either the forward or rearward movement as the case may be whereby the front wheels of the tractor are properly positioned.

With reference to the foregoing description taken in connection with the accompanying drawings, it will be noted that I have provided an extremely simple and reliable means for controlling the tractor from the implement propelled by the same. Also it will be noted that at no time during the normal operation of the tractor will the operator be compelled to leave the implement to make any adjustments on the tractor. Further, the operation of the tractor from a distant point is rendered quite as simple and reliable as operating it directly from the seat on the tractor.

It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what is claimed is:

1. The combination with a tractor of an agricultural implement arranged rearwardly of the tractor and connected to the same, an arched support formed from a length of metal bent upon itself and having its ends secured to said implement, and a plurality of control devices having their rear end portions slidably associated with said support.

2. The combination of a tractor having a depending pivoted lever and a longitudinal movable steering rod connected to the pivoted lever, and an operating rod extending rearwardly from said pivoted lever and connected to the same whereby the direction of travel of the tractor may be controlled by a longitudinal movement of the operating rod.

3. The combination with a tractor having a longitudinally movable steering rod and a pivoted lever connected to the steering rod, of a vertical arm strapped to said lever and extending upwardly from the same, and an operating rod extending rearwardly from said vertical arm and adapted to be operated at a point spaced from the tractor.

4. The combination with a tractor having a longitudinally movable steering rod and a depending lever connected to said longitudinally movable steering rod, of a vertical arm secured to said lever and extending upwardly from the same, an operating rod connected to said arm at its upper end, and means for slidably supporting the rear end portion of said operating rod.

5. The combination with a tractor having a longitudinally movable steering rod and a pivoted lever connected at its lower end to said steering rod, of a vertically adjustable rod secured to said lever, and an operating rod secured to said vertically adjustable rod and extending rearwardly from the tractor.

6. The combination with a tractor having a clutch lever, of an arm pivoted to one side of the tractor and provided intermediate its ends with a notched portion receiving a portion of said clutch lever, and a rearwardly extending rod connected to the upper end of said arm.

7. The combination with a tractor having clutch lever provided with a laterally extending pedal, of an arm pivoted to one side of the tractor and having its intermediate portion engaged with the pedal of said clutch lever, an operating rod connected to the upper end of said arm, and means to slidably support the rear end of said rod.

8. The combination with a tractor having a transmission and gear shift lever therefor, said lever being movable longitudinally and transversely of the tractor, of an arm strapped to the gear shift lever, and a longitudinally and transversely movable operating rod extending rearwardly from the tractor and connected to said arm.

9. A farm implement attachment including an arched support formed from a single length of metal bent upon itself and provided with a plurality of spaced loops, the end portions of said length of metal being provided with attaching means, and tractor control rods slidably extending through said loops.

10. The combination with a tractor having a movable clutch pedal, of an arm pivoted to the tractor and engaged with said movable clutch pedal, and a longitudinally movable operating device connected to said arm.

In testimony whereof I affix my signature.

JOSEPH REPKING. [L. S.]